(12) United States Patent
Kai et al.

(10) Patent No.: US 12,463,877 B2
(45) Date of Patent: Nov. 4, 2025

(54) DATA STORAGE METHOD AND SYSTEM

(71) Applicant: AIO Technology Reserve Pte. Ltd., The Central Singapore (SG)

(72) Inventors: Chu George Kai, Taipei (TW); I-Sheng Chen, Taipei (TW)

(73) Assignee: AIO Technology Reserve Pte. Ltd., The Central Singapore (SG)

( * ) Notice: Subject to any disclaimer, the term of this patent is extended or adjusted under 35 U.S.C. 154(b) by 710 days.

(21) Appl. No.: 17/841,791

(22) Filed: Jun. 16, 2022

(65) Prior Publication Data

US 2023/0412477 A1 Dec. 21, 2023

(51) Int. Cl.
*H04L 41/50* (2022.01)
*G06Q 40/04* (2012.01)
*H04L 45/12* (2022.01)

(52) U.S. Cl.
CPC ......... *H04L 41/5096* (2013.01); *G06Q 40/04* (2013.01); *H04L 45/12* (2013.01)

(58) Field of Classification Search
CPC .................................................. H04L 41/5096
See application file for complete search history.

(56) References Cited

U.S. PATENT DOCUMENTS

| | | | | |
|---|---|---|---|---|
| 7,349,427 B1* | 3/2008 | Canning | ............... | H04L 45/04 370/467 |
| 9,285,218 B2* | 3/2016 | Shekhar | ............... | G06Q 10/047 |
| 9,400,959 B2* | 7/2016 | Ollenberger | ......... | G06Q 10/047 |
| 9,759,576 B2* | 9/2017 | Kaplan | ............... | G01C 21/3697 |
| 10,439,961 B2* | 10/2019 | Henkel | ............... | H04L 45/12 |
| 10,491,748 B1* | 11/2019 | Wu | ............... | H04M 3/5233 |
| 11,775,562 B2* | 10/2023 | Khan | ............... | H04L 9/3239 707/610 |
| 2007/0086358 A1* | 4/2007 | Thubert | ............... | H04W 40/02 370/254 |
| 2010/0268447 A1* | 10/2010 | Griffiths | ............. | G01C 21/3423 701/532 |
| 2014/0058674 A1* | 2/2014 | Shekhar | ............. | G01C 21/3446 701/538 |
| 2014/0219105 A1* | 8/2014 | Sathappan | ............... | H04L 45/12 370/238 |
| 2014/0341222 A1* | 11/2014 | Filsfils | ............... | H04L 45/507 370/395.5 |

(Continued)

*Primary Examiner* — Guang W Li
(74) *Attorney, Agent, or Firm* — Amin, Turocy & Watson, LLP

(57) ABSTRACT

A data storage method and system, applied in a network system of distributed ledger technology. The method comprises: storing, by a first node, data of information units of the network system; determining, by a second node, a designated origin signal including an identifier of at least one origin information unit; obtaining, by the second node, data of the information units of the network system from the first node; determining, by the second node, a designated destination signal including an identifier of a destination information unit; determining, by the second node, a shortest path data from the origin information unit to the destination information unit according to the designated origin signal, the data of the information units of the network system, and the designated destination signal; and storing, by the second node, data of all information units included in the shortest path data.

9 Claims, 6 Drawing Sheets

(56) References Cited

U.S. PATENT DOCUMENTS

| | | | | |
|---|---|---|---|---|
| 2015/0012210 | A1* | 1/2015 | Griffiths | G01C 21/3423 |
| | | | | 701/410 |
| 2016/0202079 | A1* | 7/2016 | König | G08G 1/096833 |
| | | | | 701/533 |
| 2016/0248663 | A1* | 8/2016 | Patel | H04L 45/24 |
| 2017/0048168 | A1* | 2/2017 | Henkel | H04L 49/25 |
| 2017/0295101 | A1* | 10/2017 | Hira | H04L 43/10 |
| 2020/0213215 | A1* | 7/2020 | Jayadevappa | H04L 9/321 |
| 2021/0336896 | A1* | 10/2021 | Calmon | H04L 47/29 |
| 2022/0182243 | A1* | 6/2022 | Wang | H04L 45/7453 |
| 2023/0412477 | A1* | 12/2023 | Kai | H04L 41/5096 |
| 2024/0135459 | A1* | 4/2024 | Yip | H04L 9/50 |
| 2025/0068160 | A1* | 2/2025 | Mariani | G05D 1/226 |

* cited by examiner

DATA STORAGE METHOD AND SYSTEM

BACKGROUND OF THE INVENTION

1. Field of the Invention

The present invention generally relates to a data storage method and system, and, more particularly, to a data storage method and system applied in a network system of distributed ledger technology (DLT).

2. Description of the Related Art

In general, the exact same information unit (or transaction, message, etc.) as a ledger in a network system of DLT is replicated and stored on each node replicates and stores data of. However, the amount of data that needs to be stored increases over time. It may cause the nodes to operate slowly and consume a lot of storage space in the long term.

The network system of DLT in the prior art, such as IOTA, solves the above problem by deleting the data of old information units. However, this method will lose the old data and cannot obtain the complete data of the information units for verification purposes. Therefore, how to provide a data storage method and system capable of providing complete data of the information units and saving storage space has become an urgent problem to be solved in the industry.

SUMMARY OF THE INVENTION

In light of solving the foregoing problems of the prior art, the present invention provides a data storage method and system capable of providing complete data of the information units and saving storage space.

In order to solve the aforementioned problems, the data storage method of the present invention, applied in a network system of distributed ledger technology, comprises: storing, by a first node, data of information units of the network system; determining, by a second node, a designated origin signal, wherein the designated origin signal includes an identifier of at least one origin information unit; obtaining, by the second node, the data of the information units of the network system from the first node; determining, by the second node, a designated destination signal, wherein the designated destination signal includes an identifier of a destination information unit; determining, by the second node, a shortest path data from the origin information unit to the destination information unit according to the designated origin signal, the data of the information units of the network system, and the designated destination signal; and storing, by the second node, data of all information units included in the shortest path data.

In an embodiment, the step of determining, by a second node, a designated origin signal comprises: determining, by the second node, the designated origin signal sent by a user terminal; or determining, by the second node, the designated origin signal according to a predetermined rule.

In an embodiment, the step of determining, by the second node, the designated origin signal according to a predetermined rule comprises: determining, by the second node, the designated origin signal periodically according to a predetermined time interval.

In an embodiment, the step of determining, by the second node, the designated origin signal according to a predetermined rule comprises: determining, by the second node, the designated origin signal according to the data of the information unit stored on the second node with a latest timestamp.

In an embodiment, the step of determining, by a second node, a designated destination signal comprises: determining, by the second node, the designated destination signal sent by a user terminal; or determining, by the second node, the designated destination signal according to the predetermined rule.

In an embodiment, the destination information unit is an information unit with the latest timestamp, a valid information unit defined according to the predetermined rule, or a valid information unit with latest timestamp and defined according to the predetermined rule.

In an embodiment, the step of determining, by the second node, a shortest path data from the origin information unit to the destination information unit according to the designated origin signal, the data of the information units of the network system, and the designated destination signal comprises: determining, by the second node, a shortest path data from the origin information unit to the destination information unit according to the designated origin signal, the data of the information units of the network system, and the designated destination signal by using a breadth-first search algorithm.

In an embodiment, the designated origin signal includes identifiers of a plurality of origin information units, and the shortest path data is a path data including data of the least information unit.

In an embodiment, after storing, by a first node, data of information units of the network system, the method further comprises: obtaining, by the second node, data of an information unit with a specific label of the network system from the first node, and storing, by the second node, data of the information unit with the specific label.

The present invention further provides a data storage system, applied in a network system of distributed ledger technology, comprising a first node and a second node.

The first node is used to store data of information units of the network system; and the second node is used to determine a designated origin signal and a designated destination signal, wherein the designated origin signal includes an identifier of at least one origin information unit and the designated destination signal includes an identifier of a destination information unit; wherein the second node is further used to obtain data of the information units of the network system from the first node, to determine a shortest path data from the origin information unit to the destination information unit according to the designated origin signal, the data of the information units of the network system, and the designated destination signal, and to store data of all information units included in the shortest path data.

Compared to the prior art, the data storage method of the present invention obtains data of the information units of the network system from the first node by the second node. The method of the present invention further determines a shortest path data from the origin information unit to the destination information unit according to the designated origin signal, the data of the information units of the network system, and the designated destination signal by the second node, and stores data of all information units included in the shortest path data by the second node. In other words, the second node of the present invention does not store the data of all information units as the node in the prior art, but stores all the related data of the designated information unit. Therefore, a lot of storage space on the second node of the present invention can be saved, and can simultaneously store the complete data of the designated information units for the user to verify. It fully solves the problems in the prior art.

BRIEF DESCRIPTION OF THE DRAFLAPS

DETAILED DESCRIPTION

The present invention is described by the following specific embodiments. Those with ordinary skills in the arts can readily understand other advantages and functions of the present invention after reading the disclosure of this specification. Any changes or adjustments made to their relative relationships, without modifying the substantial technical contents, are also to be construed as within the range implementable by the present invention.

The data storage method of the present invention is applied in a network system of distributed ledger technology with Directed Acyclic Graph. The network system of distributed ledger technology may refer to a consensus network system that is decentralized and difficult to tamper with. The network system comprises at least one node for storing data for information units. For example, the network system can be IOTA Ledger.

Figure 1:
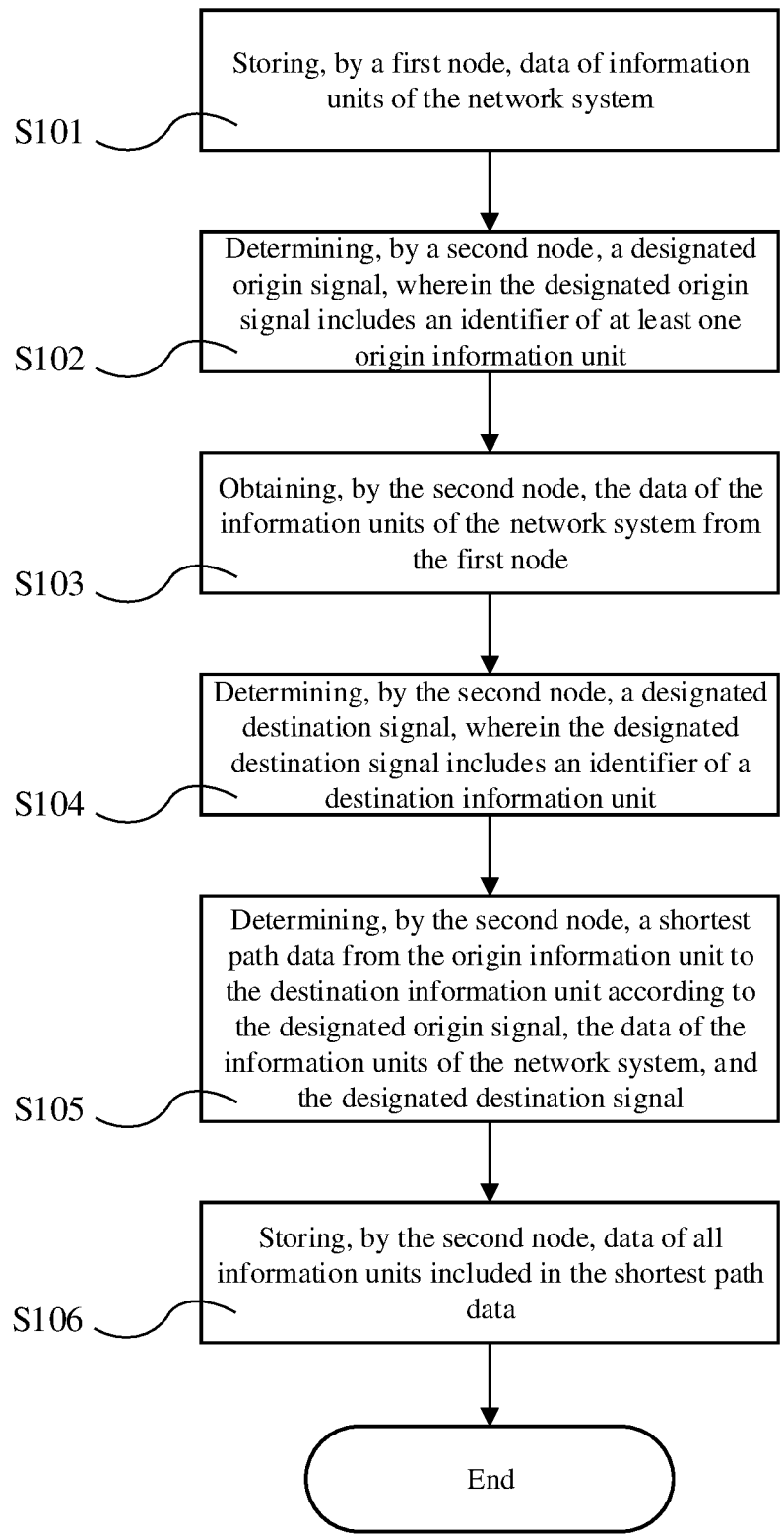
FIG. 1 illustrates a step diagram of the data storage method according to a first embodiment of the present invention.

Please refer to FIG. 1. FIG. 1 illustrates a step diagram of the data storage method according to a first embodiment of the present invention. The data storage method of the present invention comprises the following steps:

S101. Storing, by a first node, data of information units of the network system;

S102. Determining, by a second node, a designated origin signal, wherein the designated origin signal includes an identifier of at least one origin information unit;

S103. Obtaining, by the second node, the data of the information units of the network system from the first node;

S104. Determining, by the second node, a designated destination signal, wherein the designated destination signal includes an identifier of a destination information unit;

S105. Determining, by the second node, a shortest path data from the origin information unit to the destination information unit according to the designated origin signal, the data of the information units of the network system, and the designated destination signal;

S106. Storing, by the second node, data of all information units included in the shortest path data.

More specifically, in step S101, the data of the information unit of the network system is stored on the first node. For example, the data of the information units of the network system from the network system will be obtained and stored by the first node when the data of the network system is updated or a predetermined time elapses.

In step S102, the designated origin signal includes an identifier of at least one origin information unit. Therefore, the origin information unit can be determined by the second node through the identifier of the origin information unit.

In step S103, the data of the information units of the network system is obtained by the second node from the first node. It should be noted that the data of the information units obtained in step S103 is only temporarily stored on the second node. Part or all of the data of the information units of the network system on the second node may be deleted after step S106 is performed.

In step S104, the designated destination signal includes an identifier of a destination information unit. Therefore, the destination information unit may be determined by the second node through the identifier of the destination information unit.

In step S105, the shortest path data from the origin information unit to the destination information unit is determined by the second node according to the designated origin signal, the data of the information units of the network system, and the designated destination signal. For example, the shortest path data includes data of at least one information unit, in which all information units except the destination information unit can be approved by another information unit to ensure that these information units have not been tampered with. In addition, several paths may be used to connect the origin information unit to the destination information unit, wherein the shortest path data refers to the path with the least information unit among all the paths.

In step S106, data of all information units included in the shortest path data is stored on the second node. As described above, part or all of the data of information units other than the shortest path data may be deleted by the second node.

Figure 2:
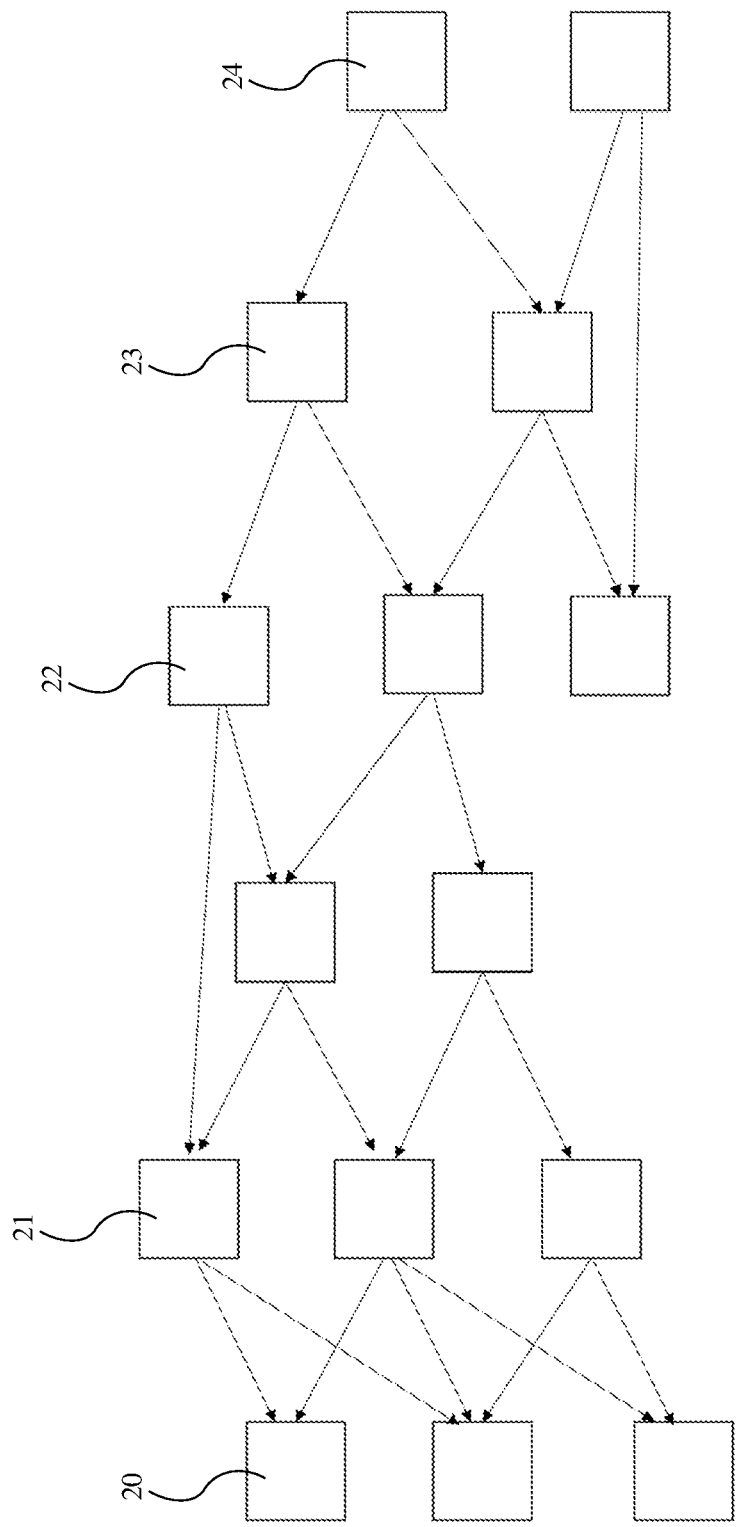
FIG. 2 illustrates a schematic view of information units of the network system according to a second embodiment of the present invention.

Please refer to FIG. 2. FIG. 2 illustrates a schematic view of information units of the network system according to a second embodiment of the present invention. As shown in the figure, the squares represent the information units and the arrow lines represent the reference directions of the information units. In this embodiment, there are fifteen (15) information units in the network system, and each information unit has two references, but not limited thereto.

More specifically, several paths may be used to connect the origin information unit 20 to the destination information unit 24. Each path may include a different number of information units. The shortest path data refers to the path with the least information unit among all the paths. For example, a breadth-first search algorithm can be used to determine the shortest path data from the origin information unit 20 to the destination information unit 24, but not limited thereto. In this embodiment, the shortest path data includes information units 20, 21, 22, 23, and 24, for a total of five information units. After the shortest path data is determined by the second node, the data of all information units included in the shortest path data, that is, the data of information units 20~24, is stored on the second node. The data of information units other than information units 20~24 will not be stored on the second node.

In an embodiment, the step S102 of determining, by a second node, a designated origin signal comprises: determining, by the second node, the designated origin signal sent by a user terminal; or determining, by the second node, the designated origin signal according to a predetermined rule. For example, the user can designate the origin information unit by using the user terminal, and send the designated origin signal with the identifier of the origin information unit to the second node. Alternatively, the designation origin signal can be determined by the second node according to a predetermined rule.

In an embodiment, the step of determining, by the second node, the designated origin signal according to a predetermined rule comprises: determining, by the second node, the designated origin signal periodically according to a predetermined time interval. For example, if the designated origin signal is not determined by the second node according to other methods (such as receiving the designated origin signal sent by the user terminal), the designated origin signal may be determined by the second node periodically according to a predetermined time interval (for example, 7 days).

In an embodiment, the step of determining, by the second node, the designated origin signal according to a predetermined rule comprises: determining, by the second node, the designated origin signal according to the data of the information unit stored on the second node with a latest timestamp.

More specifically, the purpose of performing the above steps "determining, by the second node, the designated origin signal periodically according to a predetermined time interval" or "determining, by the second node, the designated origin signal according to the data of the information unit stored on the second node with a latest timestamp" is that the designated origin signal can be determined by the second node itself and the subsequent steps S103~S106 can be performed by the second node as well. Thereby the data of the information units stored in the second node may be updated, and the data of the information units can be maintained to be verified.

In an embodiment, the step S104 of determining, by a second node, a designated destination signal comprises: determining, by the second node, the designated destination signal sent by a user terminal; or determining, by the second node, the designated destination signal according to the predetermined rule. For example, the user can designate the destination information unit by using the user terminal, and send the designated destination signal with the identifier of the destination information unit to the second node. Alternatively, the designation destination signal can be determined according to the predetermined rule.

In an embodiment, the destination information unit is an information unit with the latest timestamp, a valid information unit defined according to the predetermined rule, or a valid information unit with latest timestamp and defined according to the predetermined rule.

More specifically, the valid information unit can be defined according to the architecture of the network system used. For example, according to the coverage rate of a specific ratio (for example, the valid information unit may refer to which is referenced by more than 70% latest information units), verified by Milestone, etc., but not limited thereto.

In an embodiment, the step of determining, by the second node, a shortest path data from the origin information unit to the destination information unit according to the designated origin signal, the data of the information units of the network system, and the designated destination signal comprises: determining, by the second node, a shortest path data from the origin information unit to the destination information unit according to the designated origin signal, the data of the information units of the network system, and the designated destination signal by using a breadth-first search algorithm.

Figure 3:
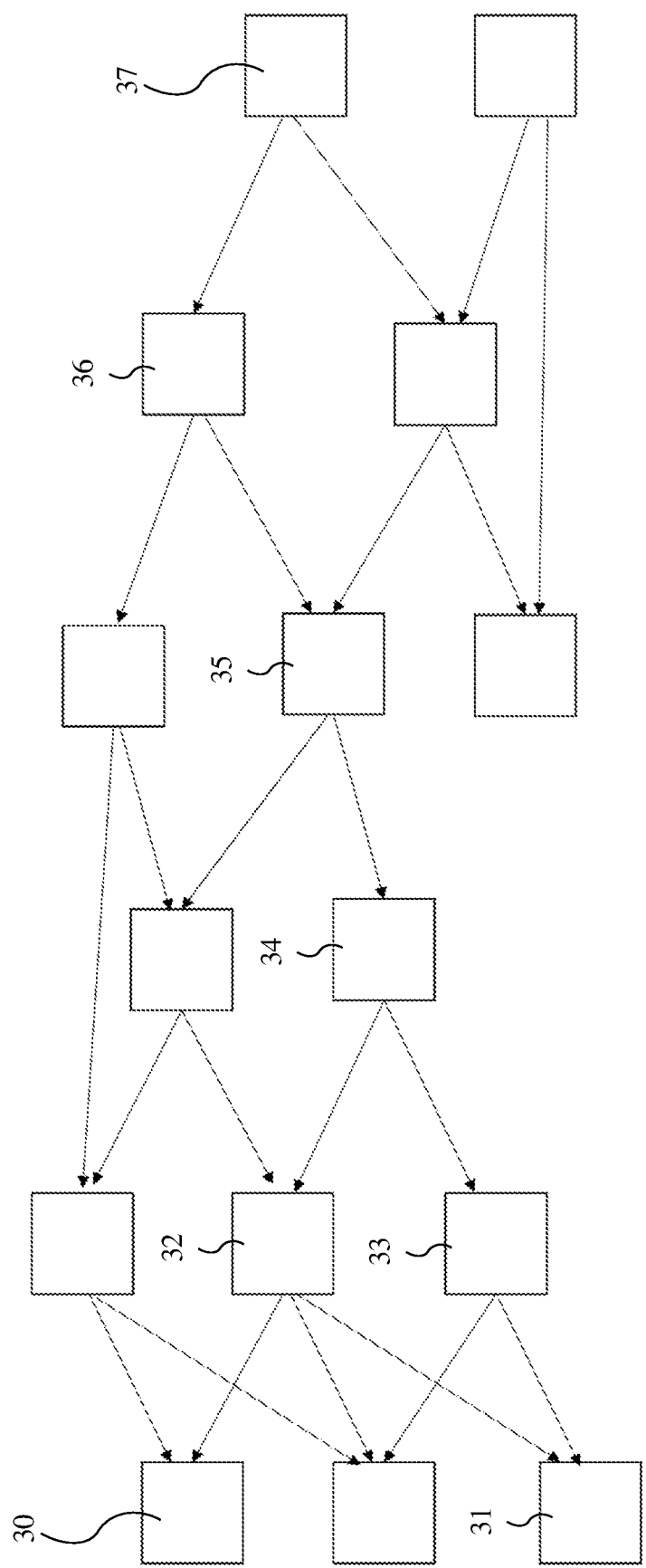
FIG. 3 illustrates a schematic view of information units of the network system according to a third embodiment of the present invention.

Please refer to FIG. 3. FIG. 3 illustrates a schematic view of information units of the network system according to a third embodiment of the present invention. As shown in the figure, the squares represent the information units, and the arrow lines represent the reference directions of the information units. In this embodiment, the network system has fifteen information units, and each information unit has two references, but not limited thereto. In an embodiment, the designated origin signal includes identifiers of a plurality of origin information units (origin information units 30, 31), and the shortest path data is a path data including data of the least information unit.

More specifically, several paths may be used to connect the origin information units 30, 31 to the destination information unit 37. Each path may include a different number of information units. The shortest path data refers to the path with the least information unit among all the paths. In this embodiment, the shortest path data includes information units 30, 31, 32, 33, 34, 35, 36 and 37, for a total of eight information units. After the shortest path data is determined by the second node, the data of all information units included in the shortest path data, that is, the data of information units 30~37, is stored on the second node. The data of information units other than information units 30~37 will not be stored on the second node.

Figure 4:
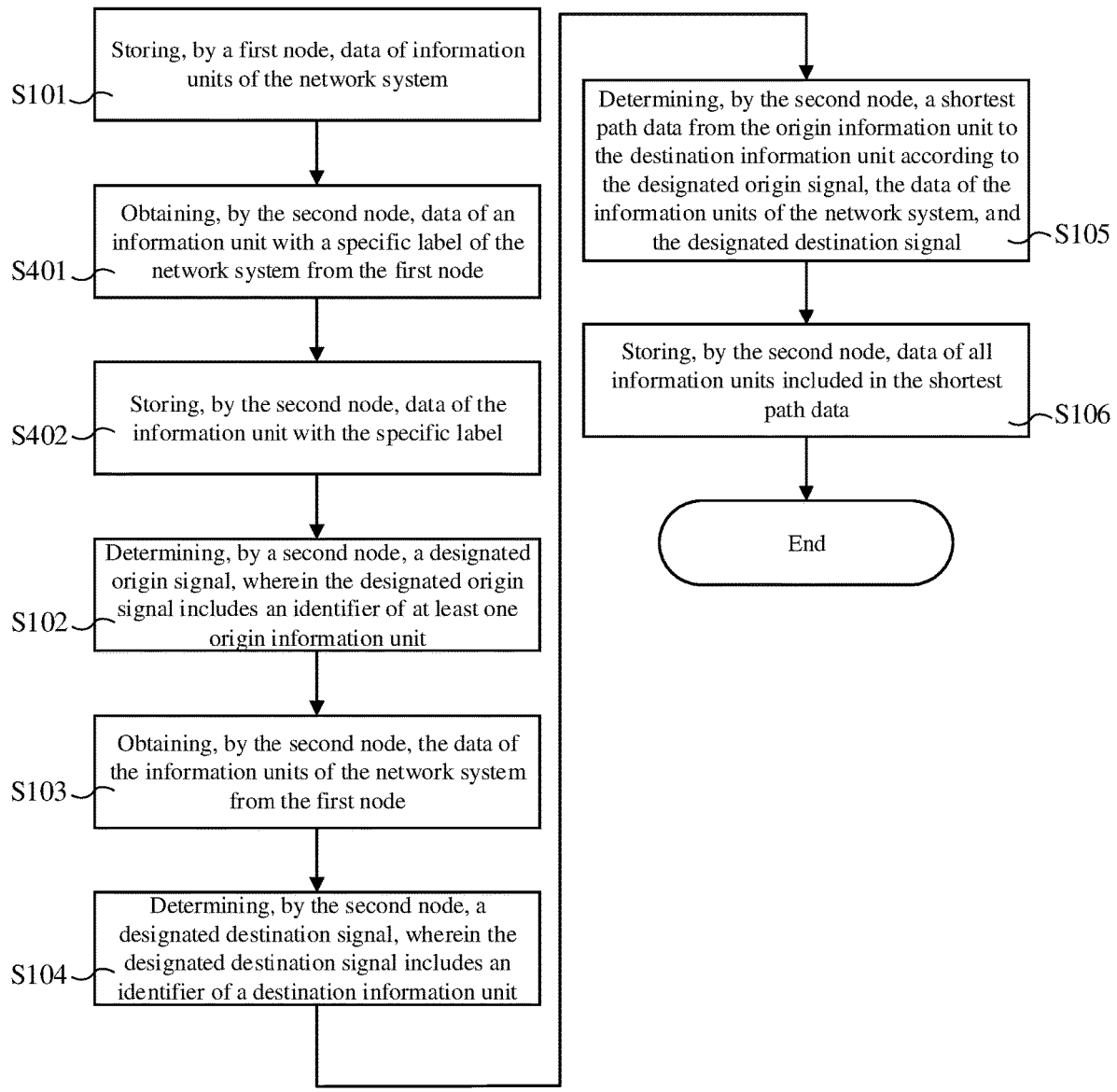
FIG. 4 illustrates a step diagram of the data storage method according to a fourth embodiment of the present invention.

Please refer to FIG. 4. FIG. 4 illustrates a step diagram of the data storage method according to a fourth embodiment of the present invention. As shown in the figure, after the step S101 of storing, by a first node, data of information units of the network system, the method further comprises:

S401. Obtaining, by the second node, data of an information unit with a specific label of the network system from the first node;

S402. Storing, by the second node, data of the information unit with the specific label.

More specifically, a specific label can be inserted into data of an information unit when the network system generates the information unit. The specific label is used to classify the information unit, for example, to indicate that the information unit which is generated by a specific service provider or a specific application, but not limited thereto. By performing steps S401 and S402, the data of the information units of a specific category for verification can be stored by the second node. It should be noted that steps S401 and S402 can be inserted into any steps after step S101, for example, steps S401 and S402 can be performed after step S106.

Figure 5:
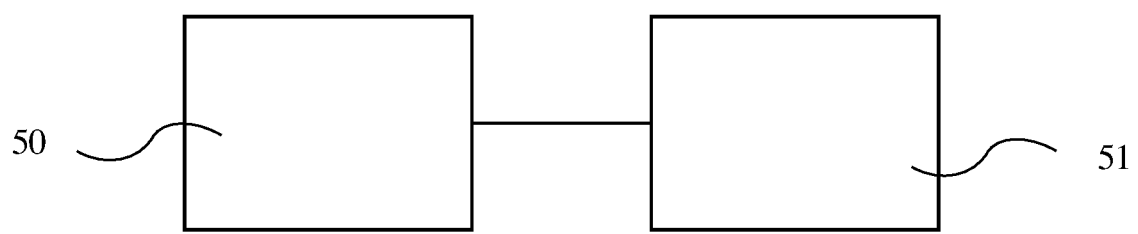
FIG. 5 illustrates a schematic view of the data storage system according to a fifth embodiment of the present invention.

Please refer to FIG. 5. FIG. 5 illustrates a schematic view of the data storage system according to a fifth embodiment of the present invention. The present invention further provides a data storage system, applied in a network system of distributed ledger technology, comprising a first node 50 and a second node 51.

The first node 50 is used to store data of information units of the network system, and the second node 51 is used to determine a designated origin signal and a designated destination signal, wherein the designated origin signal includes an identifier of at least one origin information unit and the designated destination signal includes an identifier of a destination information unit. Wherein the second node 51 is further used to obtain data of the information units of the network system from the first node 50, to determine a shortest path data from the origin information unit to the destination information unit according to the designated origin signal, the data of the information units of the network system, and the designated destination signal, and to store data of all information units included in the shortest path data.

Figure 6:
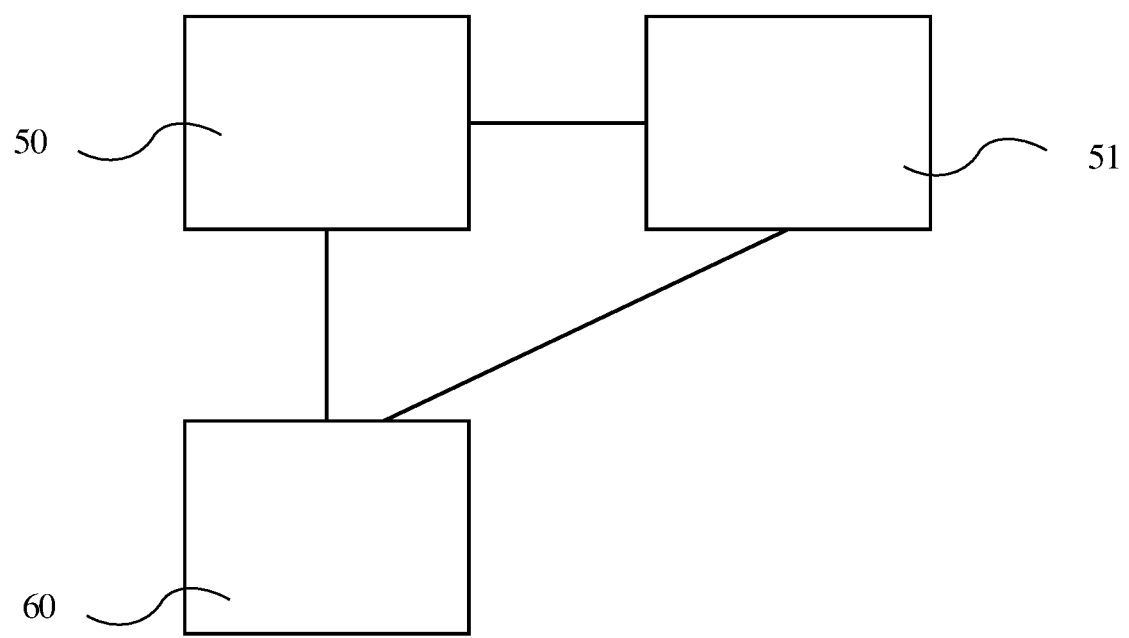
FIG. 6 illustrates a schematic view of the data storage system according to a sixth embodiment of the present invention.

Please refer to FIG. 6. FIG. 6 illustrates a schematic view of the data storage system according to a sixth embodiment of the present invention. As shown in the figure, the data storage system according to the present invention can further comprise a user terminal 60. The user terminal 60 is used to send a designated origin signal or a designated destination signal to the second node 51. For example, the first node 50, the second node 51 and the user terminal 60 may be servers, personal computers, mobile devices or other computer devices with network connection function and data storage function, but not limited thereto.

In summary, according to the data storage method of the present invention, data of the information units of the network system from the first node may be obtained by the second node. Furthermore, according to the method of the present invention, a shortest path data from the origin information unit to the destination information unit may be determined according to the designated origin signal, the data of the information units of the network system, and the designated destination signal by the second node, and data of all information units included in the shortest path data may be stored by the second node. In other words, the data of all information units is stored on the node in the prior art, but in the present invention all the related data of the designated information unit will be stored on the second node. Therefore, it can save a lot of storage space on the second node of the present invention, and the complete data of the designated information units may be simultaneously stored on the second node for the user to verify. It fully solves the problems in the prior art.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A data storage method, applied in a network system of distributed ledger technology, comprising:
   storing, by a first node, data of information units of the network system of distributed ledger technology;
   obtaining, by a second node, the data of an information unit with a specific label of the network system from the first node, wherein the specific label is used to indicate that the information unit which is generated by a specific service provider or a specific application;
   storing, by the second node, the data of the information unit with the specific label;
   determining, by the second node, a designated origin signal, wherein the designated origin signal includes an identifier of at least one origin information unit;
   obtaining, by the second node, the data of the information units of the network system of distributed ledger technology from the first node;
   determining, by the second node, a designated destination signal, wherein the designated destination signal includes an identifier of a destination information unit;
   determining, by the second node, a shortest path data from the origin information unit to the destination information unit according to the designated origin signal, the data of the information units of the network system of distributed ledger technology, and the designated destination signal; and
   storing, by the second node, data of all information units included in the shortest path data.

2. The data storage method of claim 1, wherein the step of determining, by a second node, a designated origin signal comprises:
   determining, by the second node, the designated origin signal sent by a user terminal; or
   determining, by the second node, the designated origin signal according to a predetermined rule.

3. The data storage method of claim 2, wherein the step of determining, by the second node, the designated origin signal according to a predetermined rule comprises:
   determining, by the second node, the designated origin signal periodically according to a predetermined time interval.

4. The data storage method of claim 2, wherein the step of determining, by the second node, the designated origin signal according to a predetermined rule comprises:
   determining, by the second node, the designated origin signal according to the data of the information unit stored on the second node with a latest timestamp.

5. The data storage method of claim 1, wherein the step of determining, by a second node, a designated destination signal comprises:
   determining, by the second node, the designated destination signal sent by a user terminal; or
   determining, by the second node, the designated destination signal according to the predetermined rule.

6. The data storage method of claim 1, wherein the destination information unit is an information unit with the latest timestamp, a valid information unit defined according to the predetermined rule, or a valid information unit with latest timestamp and defined according to the predetermined rule.

7. The data storage method of claim 1, wherein the step of determining, by the second node, a shortest path data from the origin information unit to the destination information unit according to the designated origin signal, the data of the information units of the network system of distributed ledger technology, and the designated destination signal comprises:
   determining, by the second node, a shortest path data from the origin information unit to the destination information unit according to the designated origin signal, the data of the information units of the network system of distributed ledger technology, and the designated destination signal by using a breadth-first search algorithm.

8. The data storage method of claim 1, wherein the designated origin signal includes identifiers of a plurality of origin information units, and the shortest path data is a path data including data of the least information unit.

9. A data storage system, applied in a network system of distributed ledger technology, comprising:
   a first node used to store data of information units of the network system of distributed ledger technology; and
   a second node used to obtain the data of an information unit with a specific label of the network system from the first node, to store the data of the information unit with the specific label, and to determine a designated origin signal and a designated destination signal, wherein the designated origin signal includes an identifier of at least one origin information unit and the designated destination signal includes an identifier of a destination information unit, and wherein the specific label is used to indicate that the information unit which is generated by a specific service provider or a specific application;
   wherein the second node is further used to obtain the data of the information units of the network system of distributed ledger technology from the first node, to determine a shortest path data from the origin information unit to the destination information unit according to the designated origin signal, the data of the information units of the network system of distributed ledger technology, and the designated destination signal, and to store data of all information units included in the shortest path data.

* * * * *